(12) United States Patent
Ah Sue et al.

(10) Patent No.: US 10,849,066 B2
(45) Date of Patent: Nov. 24, 2020

(54) MOBILE DEVICE MANAGEMENT BASED ON PREDICTED BASE STATION BEHAVIOR

(71) Applicant: Apple Inc., Cupertino, CA (US)

(72) Inventors: Jonathan Ah Sue, Munich (DE); Ralph Hasholzner, Munich (DE); Johannes Brendel, Erlangen (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/327,878

(22) PCT Filed: Sep. 29, 2016

(86) PCT No.: PCT/US2016/054272
§ 371 (c)(1),
(2) Date: Feb. 25, 2019

(87) PCT Pub. No.: WO2018/063201
PCT Pub. Date: Apr. 5, 2018

(65) Prior Publication Data
US 2019/0223098 A1     Jul. 18, 2019

(51) Int. Cl.
*H04B 7/185*     (2006.01)
*H04W 52/02*     (2009.01)
(Continued)

(52) U.S. Cl.
CPC ........ *H04W 52/0216* (2013.01); *G06N 7/005* (2013.01); *G06N 20/00* (2019.01);
(Continued)

(58) Field of Classification Search
CPC .. G06N 7/005; H04W 52/02; H04W 52/0216; H04W 52/0229; H04W 52/0203;
(Continued)

(56) References Cited

U.S. PATENT DOCUMENTS 8,780,816 B2 *   7/2014   Montojo ............... H04W 72/04
                                                                    370/329
2007/0037548 A1   2/2007   Sammour et al.
(Continued)

OTHER PUBLICATIONS

Brand et al, A Predictive Dynamic Power Management for LTE-Advanced Mobile Devices, IEEE, 6 pages, 2018.*
(Continued)

*Primary Examiner* — Frank Duong
(74) *Attorney, Agent, or Firm* — Kowert, Hood, Munyon, Rankin & Goetzel, P.C.

(57) ABSTRACT

A mobile radio communication device may operate in a wireless communication network including at least one base station configured to transmit control information and content to the mobile radio communication device. The mobile radio communication device may receive a number of communications transmitted by a base station in a number of time frames. The communication device may analyze whether the communications from the base station include control information addressed to the communication device. Based on the analysis, the mobile radio communication device may automatically predict whether an communication transmitted by the base station in an time frame will include control information addressed to the communication device. Based on the prediction, the mobile radio communication device may manage the power consumption of at least one of its components during the time frame.

25 Claims, 4 Drawing Sheets

(51) Int. Cl.
  *G06N 20/00* (2019.01)
  *G06N 7/00* (2006.01)
  *H04W 72/04* (2009.01)
  *H04W 88/02* (2009.01)

(52) U.S. Cl.
  CPC ....... *H04W 52/02* (2013.01); *H04W 52/0229* (2013.01); *H04W 52/0235* (2013.01); *H04W 72/042* (2013.01); *H04W 72/0446* (2013.01); *H04W 88/02* (2013.01); *Y02D 30/70* (2020.08)

(58) Field of Classification Search
  CPC ............. H04W 52/0235; H04W 72/04; H04W 72/042; H04W 72/0446; H04W 84/12; H04W 88/02; Y02D 70/1224; Y02D 70/1242; Y02D 70/1262; Y02D 70/1264; Y02D 70/142; Y02D 70/144; Y02D 70/146; Y02D 70/23; Y02D 70/24
  See application file for complete search history.

(56) References Cited

U.S. PATENT DOCUMENTS

| | | |
|---|---|---|
| 2012/0201182 A1 | 8/2012 | Kwon et al. |
| 2014/0204825 A1 | 7/2014 | Ekpenyong et al. |
| 2015/0092893 A1 | 4/2015 | Tabet et al. |
| 2015/0117289 A1* | 4/2015 | Voigt ................ H04W 52/0232 370/311 |

OTHER PUBLICATIONS

Brendel et al, A Binary Time Series Model of LTE Scheduling for Machine Learning Prediction, IEEE, 2 pages, 2016.*
Llopis et al, Reinforcement Learning Based Energy Efficient LTE RAN, ACM, 8 pages, Jul. 2014.*
Dusza et al, CoPoMo: a context-aware power consumption model for LTE user equipment, downloadable at wileyonlinelibrary.com, 18 pages, Aug. 2013.*
Brand et al, Adaptive Predictive Power Management for Mobile LTE Devices, IEEE, 2020, 18 pages.*
International search report based on application No. PCT/US2016/054272, dated Jun. 29, 2017(12 pages) (Reference purpose only).
Herreria-Alonso et al., "Adaptive DRX Scheme to Improve Energy Efficiency in LTE Networks with Bounded Delay",IEEE Journal on Selected Areas in Communications, Sep. 2015, pp. 2963-2972, vol. 33, Issue 12.

* cited by examiner

MOBILE DEVICE MANAGEMENT BASED ON PREDICTED BASE STATION BEHAVIOR

CROSS-REFERENCE TO RELATED APPLICATIONS

This application is a national stage entry according to 35 U.S.C. § 371 of PCT Application No. PCT/US2016/054272 filed on Sep. 29, 2016, which is incorporated herein by reference in its entirety.

TECHNICAL FIELD

Various aspects of this disclosure relate generally to operating a mobile communication device in a wireless communication network.

BACKGROUND

Extended time intervals between battery recharging are desirable for agreeable user experience of a mobile communication device (or user equipment, UE). Advanced power management functions seek to extend the battery recharging interval by operating the mobile device in efficient power states. Communication over cellular radio networks, such as networks according to the Long Term Evolution (LTE) standard, is particularly challenging for power management due to tight real-time constraints for transmitting and receiving messages via the modem of the communication device (UE). Conventional power management in a standardized system (which may be implemented as a System-on-Chips, SoCs, for example) operates with static policies. For example, criteria for switching off idling data-path building blocks (e.g. by power gating one or more chips) are defined at the time of designing the system or standard.

The LTE standard defines special modem Radio Resource Control (RRC) states to reduce the power consumption involved in maintaining a high-data rate connection including the signaling between a cellular network base station (BS) and a mobile device (UE). Those RRC states include specific operating modes like DRX (Discontinuous Reception) or cDRX (connected Discontinuous Reception) in which the user equipment (UE) needs to be active only during predefined periods to monitor control channels used by the base station (BS). In between, the modem of the communication device is allowed to go into a low-power state. A DRX or cDRX state is applicable when no user payload transmission is requested. During a data transfer process, those power save opportunities do not exist and the modem of the mobile communication device is required to be continuously active in order to continuously monitor a physical downlink control channel (PDCCH).

When the modem is in such an active phase, this does not mean that it continuously receives downlink payload (e.g. IP packets) or continuously sends uplink payload. The base station schedules downlink (DL) grants (e.g. on a physical downlink shared channel, PDSCH) and uplink (UL) grants (e.g. on a physical uplink shared channel, PUSCH) with a (sub-)frame granularity of 1 millisecond, for example. From the modem perspective, the (sub-)frames in which the modem gets scheduled do not appear deterministic. Therefore, the modem is supposed to monitor the PDCCH continuously in order to check whether or not a grant is assigned to the user equipment (UE). The continuous operation requires the modem to be in a high power state even if no payload is received.

FIG. 1 shows a typical sequence 100 of scheduling signals transmitted by a base station during a video streaming use case. The sub-frames which contain UE-relevant items of downlink control information (DCI) in the physical downlink control channel (PDCCH) are indicated as bars. In between (white spaces), the mobile communication device monitors and decodes the channel PDCCH without obtaining any technical benefit although energy is used by the monitoring and decoding processes running in the mobile communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
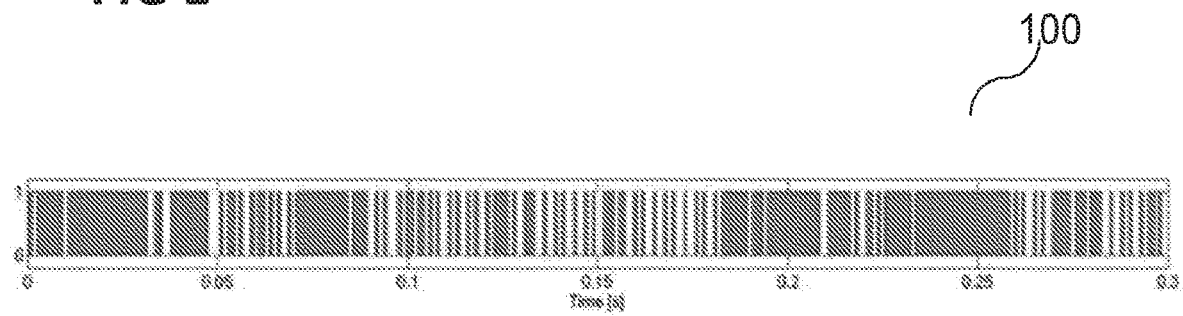
FIG. 1 shows a typical sequence of scheduling signals transmitted by a base station during an exemplary video streaming operation.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The components (e.g. an application processor) of a communication device may for example be implemented by one or more circuits. A "circuit" may be understood as any kind of a logic implementing entity, which may be special purpose circuitry or a processor executing software stored in a memory, firmware, or any combination thereof (e.g. an operating system). Thus, a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

A "circuit" can also refer to a memory, e.g. an on-chip SRAM or SDRAM IC. There are special low-power modes for memories, e.g. self-refresh mode for SDRAM or retention mode for SRAM in which the memory content is preserved but the memory cannot be accessed.

For purposes of this disclosure, radio communication technologies may be classified as one of a Short Range radio communication technology, Metropolitan Area System radio communication technology, or Cellular Wide Area radio communication technology (also referred to as Wireless Wide Area Network (WWAN) radio communication technology). Short Range radio communication technologies include Bluetooth, WLAN (Wireless Local Area Network) (e.g. according to any IEEE 802.11 standard or e.g. WiFi), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include Global System for Mobile Communications (GSM), Universal Mobile Telecommunications System (UMTS), Long Term Evolution (LTE), LTE-Advanced (LTE-A), Code Division Multiple Access (CDMA), Wideband CDMA (WCDMA), General Packet Radio Service (GPRS), Enhanced Data Rates for GSM Evolution (EDGE), High Speed Packet Access (HSPA), HSPA Plus (HSPA+), and other similar radio communication technologies.

The term "network" as utilized herein, e.g. in reference to a communication network such as a mobile communication network, is intended to encompass both an access section of a network (e.g. a radio access network (RAN) section) and a core section of a network (e.g. a core network section).

Unless explicitly specified, the term "transmit" encompasses both direct and indirect transmission. Similarly, the term "receive" encompasses both direct and indirect reception unless explicitly specified.

The present disclosure uses the expression "mobile communication device" and the standard terminology "user equipment" (or "UE") as synonyms. Where the description refers to the "modem", it means the modem of the mobile communication device.

The present disclosure does not rely on any specific distinction between "frame" and "sub-frame" which may be suggested by any standard (e.g. LTE) terminology.

Reducing the operation of a device component may encompass powering down that component or putting it into an intermediate low power state, a waiting or sleeping state or the like. Alternative power saving modes may include reducing a clock signal frequency or the supply voltage of the circuit.

Candidate components whose operation may be reduced or stopped may encompass the modem (notably the receive chain) of the mobile communication device and/or any component that is waiting to transmit data to, or to receive data from, the network via the modem.

A component to be stopped or slowed down may be any hardware circuitry or software module, since a reduced operation of any component translates directly or indirectly into a reduced consumption of energy during the time of reduced operation.

Low power states of communications functions and components implemented in hardware may be realized by clock gating or power gating, for example. This reduces power consumption by avoiding dynamic power requirements and leakage current contributions of the clock gated or power gated circuits. A low-power state of a memory may include operating the memory in a retention state.

Low power states of communications functions and components implemented in software and executed on shared hardware resources, such as a CPU, may result in less computational load or shorter activity cycles of the shared hardware resources. Generic power saving techniques such as dynamic voltage and frequency scaling (DVFS) for CPUs may translate the reduced load or activity into reduced power consumption.

The energy savings achieved may be particularly important in a mobile radio communication device which runs on batteries. Reducing the operation of device components during inactive periods of the transceiver extends the recharging interval of the communication device.

According to an aspect of the present disclosure, the mobile communication device may predict information that a base station is going to transmit in the control channel of a next sub-frame, i.e. a sub-frame following a number of preceding sub-frames monitored by the mobile communication device. The prediction may rely on machine learning techniques.

Depending on a prediction result, at least one of various power save measures may be executed in the mobile communication device. For example, if the mobile communication device does not anticipate any uplink (UL) or downlink (DL) grant (DCI) for the next sub-frame, it may turn off its modem and, thus, suspend reception of the control channel for the next sub-frame. The mobile communication device may only turn on its modem again and resume control-channel reception when it predicts a high probability of downlink control information (DCI) for the next sub-frame. This approach reduces average power consumption of the modem of the mobile communication device as compared to continuous control-channel reception.

In another example, the mobile communication device (or user equipment, UE) may predict the arrival of UE-relevant information but may still be able to put its receive channel into a low-power (or sleep) state when the mobile communication device is able to predict the incoming information (control information and/or content) and, therefore, does not have to listen to the next transmission from the base station.

Modem power consumption in the "receiver active" state may be further reduced in the following example: If the modem is able to implement multiple operating states with different levels of processing performance and power consumption, the user equipment (UE) may select the most power-efficient modem operating state for the next sub-frame based on predicted DCI details.

Prediction accuracy may be improved by admitting exogenous information, by using cost sensitive classification, and/or by tuning the predictor based on network traffic.

The present disclosure also provides methods for recovering from prediction errors.

Conventional LTE modems monitor and decode the physical downlink control channel PDCCH in every sub-frame and, if no downlink control information DCI is received, suspend reception and enter modem low power states for the rest of this sub-frame. A method according to the present disclosure allows the modem to predict whether the next PDCCH contains relevant downlink control information DCI and to completely skip PDCCH decoding if the next PDCCH is not expected to contain relevant downlink control information DCI. This reduces UE power consumption especially in scenarios where the user equipment (UE) is rarely scheduled (e.g. for low data rate applications) and hence power consumption of PDCCH monitoring is significant compared to power consumption of user data processing.

In conventional mobile device implementations, applications use data traffic context information to trigger modem state transitions into low power modes when long phases of inactivity are expected. Applications communicating over UMTS (Universal Mobile Telecommunications System) networks, e.g. push email clients, may trigger RRC (Radio Resource Control) Connection release and may transition the user equipment (UE) to a low power CELL_PCH (Cell Paging Channel) state or mode by initiating the Signaling Connection Release Indicator (Fast Dormancy) message after the push operation is completed.

The approach according to the present disclosure allows the modem to enter low power states even for very short (1 ms) phases of inactivity by extracting the traffic context information in the PHY (physical) layer, e.g. by machine learning. This reduces UE power consumption in scenarios including frequent phases of short modem inactivity during an application data burst, e.g. video streaming.

The cDRX feature of conventional LTE networks triggers the user equipment UE to transition to low power states in an RRC Connected state if modem inactivity (no receipt of DCI) exceeds the drxInactivity network timer. drxInactivity timer and other cDRX network parameters are static. They only result in substantial UE power saving when the actual user data traffic is well aligned with the network timers and timing of signaling messages, e.g. as in VoLTE (Voice over LTE).

The approach according to the present disclosure triggers UE low-power state transitions based on actual user data traffic characteristics rather than static network parameters. This reduces UE power consumption in scenarios with frequent modem inactivity phases shorter than the drxInactivity timer, e.g. during a typical video streaming.

Prediction of Network Grants on 1 ms Granularity Using Machine Learning

In a mobile communication system like LTE, user equipment devices (UEs) are controlled by the base station BS by means of the control channel PDCCH. With the help of the PDCCH, the base station BS signals relevant parameters needed for UL/DL payload data transmission to the UEs in a 1 ms (sub-frame) time granularity in the form of DCIs. The scheduler of the vendor-specific base station BS allocates DCIs for uplink and downlink grants to the UEs in a deterministic manner dependent on parameters such as channel condition, number of UEs in a cell, and/or required data rate. The allocation is deterministic but not transparent to the individual user equipment (UE). Therefore, conventional user equipment (UE) is required to permanently decode the control channel PDCCH to search for UE-relevant DCIs.

However, as the scheduler in the base station BS follows deterministic algorithms, the inventors have established that the behavior of the scheduler may be predicted even though the scheduling algorithms are usually kept confidential by the manufacturers of base stations. Automatic prediction may be achieved with the help of machine learning techniques, for example.

Figure 2:
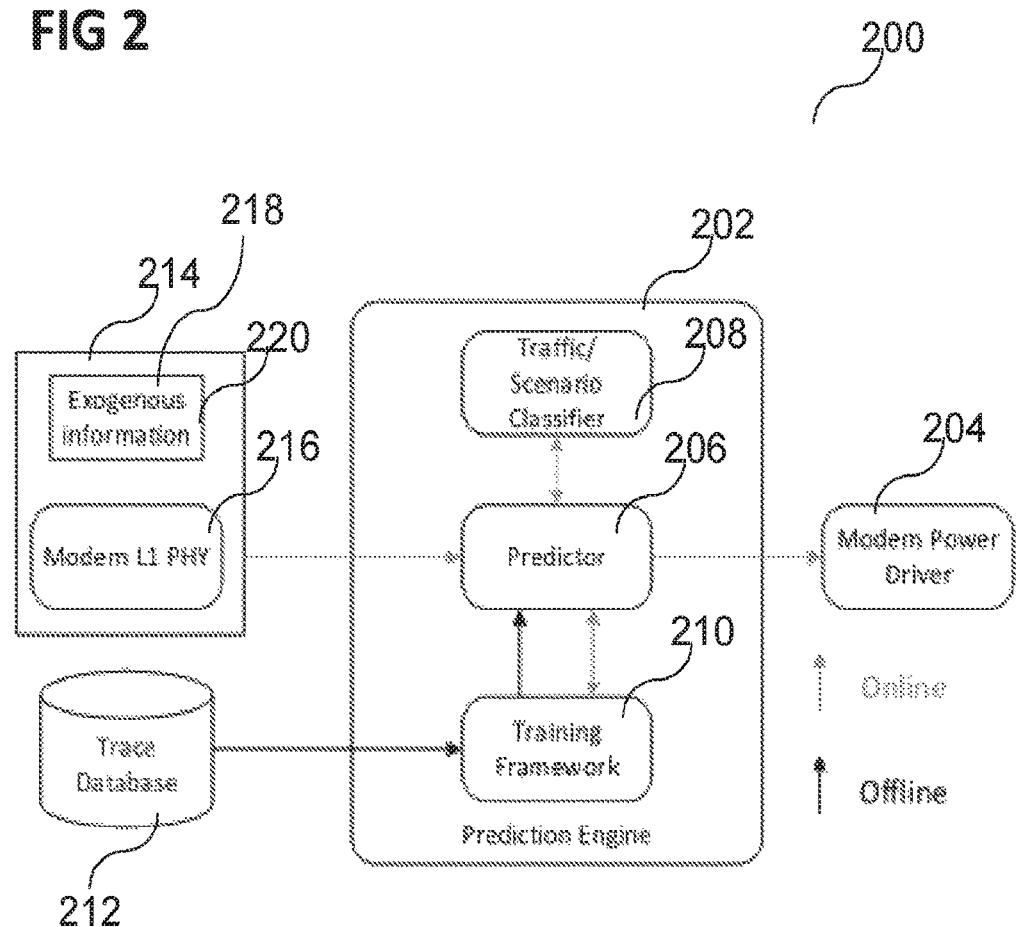
FIG. 2 is a block diagram of a predictor embedded in a mobile communication device.

FIG. 2 shows a block diagram of an exemplary network scheduling prediction device 200 and process. A prediction engine 202 may observe the received control information of the LTE PHY (e.g. DCIs in the PDCCH) and may predict the content of the control channel for the next sub-frame. The prediction engine 202 may provide the predicted information to several modem components which may use it for various optimization tasks. Notably, a power driver 204 coupled to the prediction engine 202 may use the predicted information to micro-manage and optimize power consumption, in relation to micro-time intervals which may be numerous within a given period of time.

The prediction engine 202 may include a predictor circuit 206, a traffic/scenario classifier 208 (e.g. a traffic/scenario classifier circuit 208), and a training framework 210 (e.g. a training framework circuit 210).

A trace database 212 coupled to the prediction engine 202, e.g. to the training framework 210, may be provided to archive and retrieve a plurality or, for example, a multiplicity of communications that have been transmitted by a base station to a mobile communication device 214. Such a pool of archived communications may be provided from the trace database 206 to the prediction engine 202 to analyze the behavior of the base station and to train one or more prediction algorithms off-line. It is to be noted that the prediction engine 202, as well as the modem power driver 204 and optionally the trace database 212 may be implemented as a part of the mobile radio communication device 214.

Generally, the following approaches may be used to train the predictor circuit 206 (e.g. implemented by the training framework circuit 210):

Offline training may use a database (e.g. the trace database 212) of archived LTE PHY traces, which are used to train the predictor circuit 206 for different scenarios and traffic types in advance. During operation, scenario-dependent parameter presets can be loaded. The parameters themselves are not changed.

Online training optimizes the parameters of the predictor circuit 206 permanently during operation based on predictor circuit 206 performance metrics.

A third option is a combination of online and offline training. A traffic/scenario classifier 208 (e.g. a traffic/scenario classifier circuit 208) may be used to adapt the predictor to a current system state (cf. section 3.c).

Figure 3:
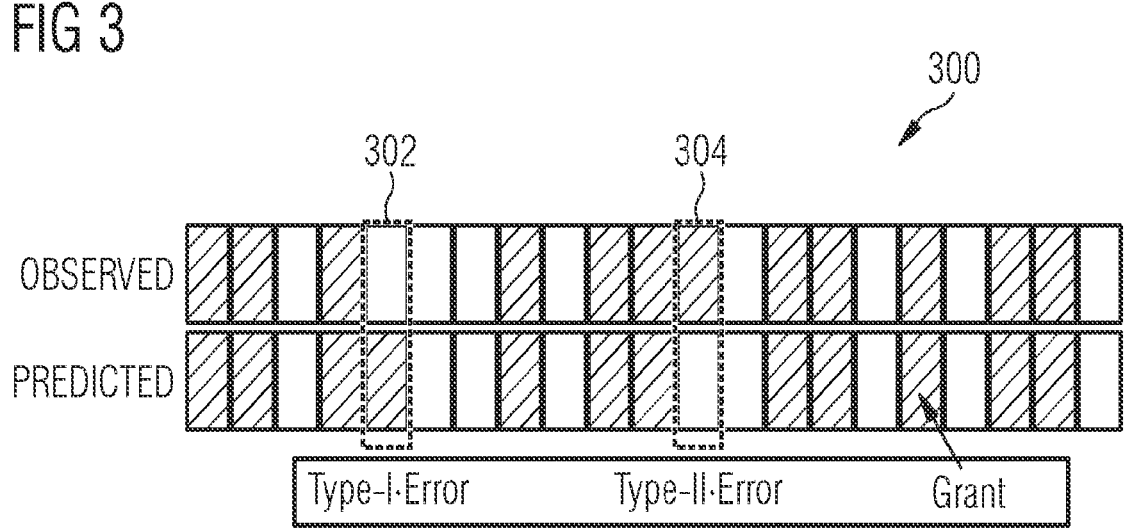
FIG. 3 depicts a sequence of scheduling signals predicted by a mobile communication device, and an observed sequence of actual scheduling signals transmitted by a base station.

The input and the output of the predictor circuit 206 may be modeled as binary time series, where "0" stands for "no UL grant in PDCCH received" and "1" stands for "UL grant in PDCCH received" as shown in FIG. 3.

FIG. 3 also illustrates in a diagram 300 that two types of prediction errors may occur:

Type-I errors 302: "1" is predicted and "0" is measured.
Type-II errors 304: "0" is predicted and "1" is measured.

The training framework circuit 210 may implement machine learning (ML) algorithms together with the predictor 206 to predict uplink grants for the next sub-frame e.g. based on eight previous sub-frames during a video streaming use case in a live network. For this exemplary scenario, a measured False Negative Rate (FNR=number of type-II errors/number of observed grants) of 1.5% (standard deviation=0.5%) was achieved in a practical test.

Three different ML algorithms have been implemented by the training framework circuit 210 together with the predictor 206 and have been tested which are Multilayer Perceptron (MLP),
Elman Recurrent Neural Network (ELNN), and
Support Vector Regression (SVR).
Various effects of said algorithms include:
non-linear mapping between inputs and targets with little statistical knowledge on the data, and
low computational complexity compared to other machine learning algorithms, such as deep learning algorithms.

The training framework circuit 210 may train the predictor 206 using any one or more of the algorithms described above or any other suitable algorithm. The trained predictor 206 may then perform a prediction operation. The prediction operation may be summarized as follows:

A time series of base station communications may be inputted to a prediction engine executing a prediction algorithm. Elements of the time series may be vectors comprised of DCI, or DCI and exogenous information. The prediction concerns future DCI, either one time frame or plural time frames ahead. The parameters of the prediction algorithm, e.g. the weights of neurons in a neural network may not be changed during the prediction operation but may be determined during a separate training operation performed by the training framework circuit 210 and the predictor 206.

The training using a learning algorithm may be summarized as follows:

A time series of "base station" communications may be inputted to the training framework circuit 210, which may implement a training engine. The time series may correspond to that of a regular operation but the desired result of the prediction is known. Parameters of the prediction algorithm may be adapted according to an optimization criterion using an optimization algorithm (e.g. Levenberg-Marquardt algorithm) to thereby train the predictor 206.

Modem Power Saving by Predicting Network Grants

As an example, the network scheduling prediction may apply power saving measures to a modem 216 of the mobile radio communication device 214. As described in the previous section, uplink and downlink grants within the control channel PDCCH may be modeled as two binary time series and predicted for the next sub-frame.

Figure 4:
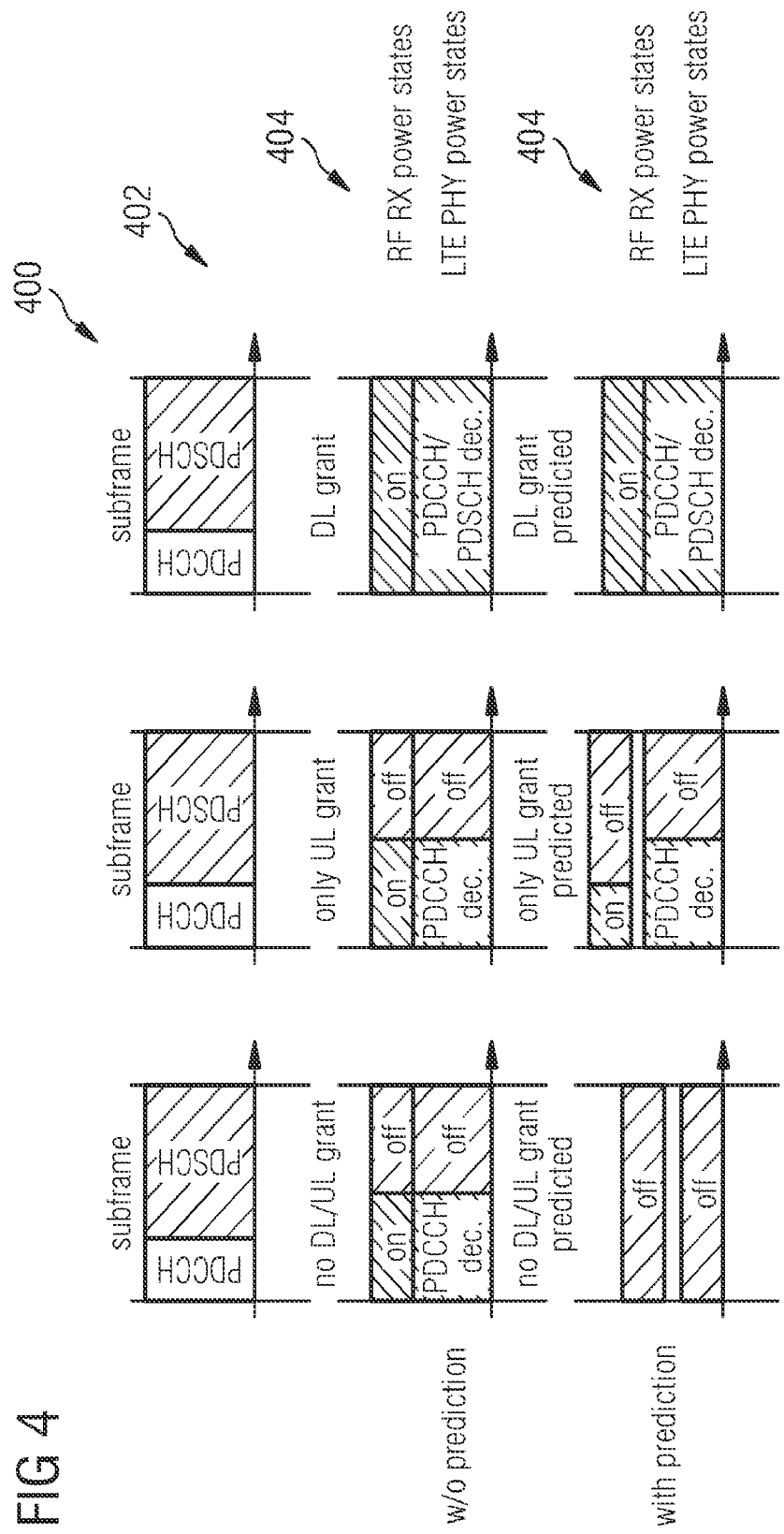
FIG. 4 illustrates power saving measures that may be utilized in a mobile communication device predicting base station messages as compared to a mobile communication device not predicting base station messages.

The mobile radio communication device 214 may perform the following power save measures dependent on the outcome of the prediction as depicted in FIG. 4:

If the next PDCCH contains no DL grant and no UL grant, the mobile radio communication device 214 may set the modem 216 to a sleep state for the complete sub-frame.

If the next PDCCH contains only an uplink (UL) grant, it is sufficient to receive only the PDCCH, and the mobile radio communication device 214 may set the modem 216 to a sleep state for the remaining sub-frame (the "RF on" time may be reduced as the RF is switched off directly after the PDCCH reception; there is no need to wait for PDCCH decoding).

If the next PDCCH contains a downlink (DL) grant, the mobile radio communication device 214 may set the modem 216 of the mobile communication device is required to be in operation for the entire sub-frame.

Figure 5:
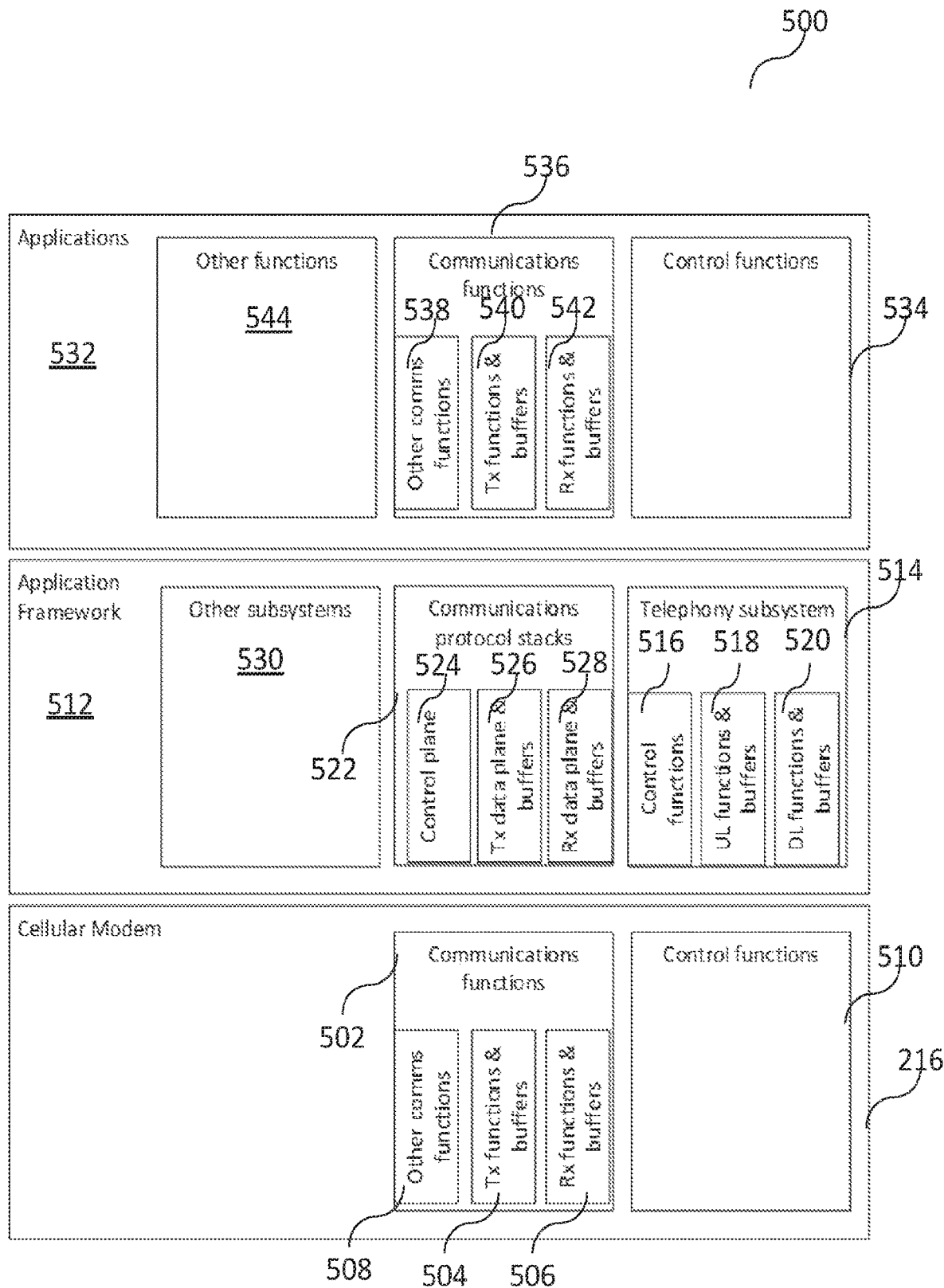
FIG. 5 presents an overview of receive, transmit and control functions in various subsystems of a mobile communication device.

The mobile radio communication device 214 may implement various communication layers and their respective functions in one or more circuits. FIG. 4 shows a diagram 400 illustrating functions (in other words the operation) of the RF (radio frequency) layer 402 and the LTE PHY (physical) layer 404 as examples of mobile radio communication device subsystems subject to the power save measures mentioned above. In general, those power saving mechanisms may be applied to all receive and transmit functions in the mobile radio communication device 214. FIG. 5 shows a block diagram 500 illustrating an overview of pertinent receive (Rx), transmit (tx) and control functions in various subsystems of the mobile radio communication device 214. By way of example, the mobile radio communication device 214 may include the modem (also referred to as cellular modem) 216, which may implement various communications functions 502 such as e.g. transmit (Tx) functions and buffers 504, receive (Rx) functions and buffers 506, and other communications functions 508. Furthermore, the modem 216 may implement various control functions 510. The mobile radio communication device 214 may further include one or more processors (not shown) implementing an application framework 512. The application framework 512 may include a telephony subsystem 514 including e.g. telephony control functions 516, telephony uplink functions and buffers 518 and telephony downlink functions and buffers 520. The application framework 512 may further include communications protocol stacks 522, which may e.g. include an implementation of a control plane 524, transmit (Tx) data plane and buffers 526, and receive (Rx) data plane and buffers 528. The application framework 512 may further include other subsystems 530, as desired. The mobile radio communication device 214 may further include one or more processors (not shown) implementing one or more applications (e.g. application programs) 532. The applications 532 may include application control functions 534 and application communications functions 536. The application communications functions 536 in turn may include transmit (Tx) functions and buffers 540, receive (Rx) functions and buffers 542, and other communications functions 544, as desired.

Applying the prediction-dependent power saving measures to the video streaming use case from FIG. 1 with an assumed (hypothetical) ideal prediction algorithm (0% Type-I errors and 0% Type-II errors) may result in a power saving of about 8% (calculation based on a current modem platform). During 33% of the time, no PDCCH decoding is required (white bars), the active power state (66% of the time, dark bars) remaining unchanged. In general, the power saving is highly dependent on traffic profile and intensity.

Further examples of how the DCI prediction may be used for power saving measures are given in the following:

Prediction of the DCI location within the PDCCH: The positions of the mobile radio communication device (e.g. User Equipment (UE))-relevant DCIs within the physical downlink control channel PDCCH are not known in advance, which means that the UE probes all possible locations. By predicting the DCI location, the search space and therefore the search time may be reduced and the mobile radio communication device 214 (e.g. the UE 214) may set parts of the modem 216 to low power states faster.

Prediction of RB (resource block) allocation: By predicting the resource block allocation for the next downlink grant, the received bandwidth may be adapted and reduced dependent on the location of the resource blocks in the next sub-frame. This may lead to a reduced power consumption within the RF 402 and the LTE PHY 404 layers.

Prediction of modulation and coding scheme (MCS): By predicting the MCS for the next DL grant, the Error Vector Magnitude (EVM) requirements may be dynamically adapted. For example, when only a low-order modulation scheme (like QPSK, Quadrature Phase Shift Keying) is expected, parameters like LNA (Low Noise Amplifier) gain, linearity requirements, LO (Local Oscillator) phase noise or sampling width do not need to be set for the worst case (like 256-QAM, quadrature amplitude modulation) but only for the QPSK, which reduces the power consumption in the modem 216.

Prediction of the complete DCI: By predicting the content of the DCI for the next sub-frame, the PDCCH does not need to be received and decoded at all and only payload data is received.

Scenario-Specific Optimization

Enhanced Prediction Based on Exogenous Information

To improve the reliability of the prediction (e.g. in terms of FNR), the predictor 206 may use additional, exogenous information 218 (e.g. stored in a memory 220 of the mobile radio communication device 214) in the prediction process. Such parameters may be provided as additional input to the predictor. As the behavior of the BS scheduler is dependent on several different parameters, adding exogenous information 218 allows a better emulation of the scheduler. Sources of exogenous information 218 may include not just the LTE physical layer PHY 402 but also parameters from higher protocol layers implemented in the mobile radio communication device 214 and the mobile radio communication device 214 may even use information from or about one or more application layers. By way of example, the exogenous information 218 may include:

L PHY parameters: MCS, RB allocation, NDI (new data indicator), RV (redundancy version), RSRP (Reference Signal Received Power), RSSI (Received Signal Strength Indicator), or SNR (Signal to Noise ratio).

Higher protocol layer parameters: MAC (Medium Access Control) buffer (buffer status report), TCP/IP buffer status, cellular network ID and configuration.

Application layer parameters: date, time and location of the user equipment (UE), traffic type (e.g. VoLTE, TCP, UDP).

By adding exogenous parameters, the false negative rate (FNR) in the video streaming experiment may be reduced from 8.9% (standard deviation=0.9%) to 1.5% (standard deviation=0.5%).

Cost Sensitive Classification

Type-II errors 304 may be critical as in that case, the modem 216 will switch to a low-power receiving state and therefore, will not be aware of any incoming information. In other words, a type-II error 304 may be equivalent to missing the control information (DCI). Therefore, those errors 304 may slightly degrade the performance of the mobile radio communication device 214 in the wireless network.

Type-I errors 302 mean non-optimized power management: For the sub-frames concerned by those errors 302, the modem 216 could be switched to a low-power state. Since this is not done (the modem remains in active power state), power consumed to monitor the control channel is wasted.

To take this into account, machine learning (ML) algorithms may be combined with a cost sensitive learning called cost sensitive classification (CSC) which may have the effect of being non-intrusive (the ML equations do not have to be changed) and, therefore, the cost sensitive classification (CSC) may be easily combined with the proposed ML algorithms. The trade-off between type-I 302 and type-II 304 errors may be defined by a cost matrix:

$$\underline{C} = \begin{matrix} C(1,1) & C(0,1) \\ C(1,0) & C(0,0) \end{matrix}$$

with C(y,t) being the cost of y being predicted while t is in fact received. This cost matrix can be adapted regarding several types of scenarios (e.g. different traffic, networks) and different optimization criteria. Cost sensitive classification (CSC) allows a tradeoff between avoiding prediction errors (type-II errors) and non-optimized power policy to optimize the overall power consumption and to minimize performance degradation by missed DCIs.

Traffic Dependent Prediction

In another example, the mobile radio communication device 214 may include a monitoring engine (not shown) configured to extract statistical properties of the downlink and uplink traffic, e.g. average traffic intensity, inter-arrival time or mutual information. The extracted statistical properties are provided as input parameters to the (e.g. configurable) prediction engine 202 capable of scaling the performance of prediction algorithms with complexity and power consumption. The algorithms may be selected during run-time based on the expected power saving potential of different prediction algorithms in different traffic types which can be evaluated at design time e.g. by system level simulations and stored e.g. in a look-up table. The power consumption of the selected algorithm may be chosen to be lower than the system level power consumption saving potential to ensure net power saving. The power consumption of the prediction engine 202 for different prediction algorithms may be evaluated at design time, e.g. by power simulations, and stored e.g. in a look-up table.

In another example, the selection of prediction algorithms and configuration of the prediction engine 202 is further enhanced by context information from higher protocol stack layers, e.g. RRC state information. With this information, the power management subsystem of the mobile radio communication device 214 can e.g. turn off (power gate) the prediction engine 202 to save leakage currents in scenarios where prediction is not expected to reduce system power consumption, e.g. when the modem is in RRC idle or connected DRX states.

In a combination of the two aforementioned approaches, it is the monitoring engine that notifies the power management subsystem to turn off (power gate) the prediction engine 202 and save leakage currents for traffic types where prediction is not expected to reduce the overall power consumption of the system.

Thus, a scenario-dependent selection of a prediction algorithm may be summarized as follows: A monitor of the mobile radio communication device 214 may observe metadata, e.g. traffic intensity, and a configuration infrastructure in the prediction and training engines may output configuration data for the prediction engine 202 in order to route the inputted time series to different prediction algorithms for different scenarios (assuming that plural prediction algorithms are implemented in parallel), or to bypass the algorithmic prediction (when expected to be inefficient).

Error Recovery

In an aspect of the present disclosure, time-series input for the prediction engine 202 is constructed from received LTE PDCCH signaling information (DCIs). But if the receive-chain is turned off by the power management subsystem of the mobile radio communication device 214 as a result of the prediction when no grant is predicted, no new sample of the time series is available as input for the next prediction. Therefore, in a supplementary aspect, the prediction may be bypassed by triggering receive-chain power state transitions under certain conditions so as to force receive activity and ensure that enough samples are received to guarantee stable operation of the prediction algorithms regardless of the prediction output. In one example, the mobile radio communication device 214 may override predictor output by a deterministic, e.g. periodic or pseudo-random, time series having the desired minimum rate of "receiver on" events.

In another exemplary aspect, the prediction engine 202 may be enhanced with an input-counter tracking the number of new input samples per time window (determined by e.g. a real-time clock function). In this example, a deterministic overriding control of the mobile radio communication device 214 is only used if the number of received samples per time interval is lower than a threshold.

In an exemplary implementation with multi-step ahead prediction, the input tracking and time window mechanism described above may even predict future receive activity for a plurality of time frames.

False negative predictions cause the UE 214 to miss downlink control information DCI and, hence, may degrade effective throughput in the channel PDSCH or PUSCH. The regular H-ARQ (Hybrid Automatic Repeat Request) mechanism of the LTE standard is designed to ensure that the UE 214 and the base station BS (evolved NodeB, eNB) recover from such dysfunctional events. Prediction algorithms may be selected to ensure that the False Negative Rate FNR and associated throughput degradation are kept within limits acceptable to UE users and network operators.

False positive predictions may not require any recovery mechanism as they do not degrade modem 216 performance.

In summary, the present disclosure may provide an improved computerized mobile radio communication device 214, and an improved method of operating the same, with a view to reducing its power consumption and extending its battery lifetime.

A mobile communication device may operate in a wireless communication network including at least one base station configured to transmit control information and content to the mobile communication device. The mobile communication device may receive n communications transmitted by a base station in n respective time frames (or sub-frames), n being an integer greater than or equal to 1. In other words, the number of communications and the number of respective time frames may be greater than or equal to 1. The mobile communication device may analyze whether the n communications from the base station include control information addressed to the mobile communication device. Based on the analysis, the mobile communication device may automatically predict whether a (e.g. ensuing) communication transmitted by the base station in a (e.g. ensuing) time frame will include control information addressed to the mobile communication device. Based on the prediction, the mobile communication device may manage the power consumption of at least one of its components during the (e.g. ensuing) time frame. An ensuing communication may be any subsequent (in other words future) communication. Furthermore, an ensuing time frame may be understood as a subsequent (in other words future) time frame, immediately or later in the future after having received the number of communications transmitted by the base station.

While power management is a prominent example of prediction-based management of the mobile communication device, prediction-based management is not limited to power management. For example, based on predicted base station behavior, hardware and/or software resources (e.g. computing time) of the mobile communication device may be allocated or dedicated to a specific UE task for at least two successive time frames, so as to enhance the computational efficiency of the mobile communication device by avoiding interrupts, for example. Thus, shared resources may be kept allocated for more than 1 TTI (Transmission Time Interval) based on prediction rather than releasing them after each TTI and waiting for the next interrupt to re-allocate them. The increased computational efficiency can be beneficially translated into additional performance headroom for other tasks that may be executed on the same shared resources in a multi-tasking fashion, or into cost reduction (e.g. die area) of shared resources.

Improved power management provides an additional advantageous effect, on top of extended battery life time, in that less switching activity in the system and circuits being powered at lower supply voltages, or not being powered at all, means less stress to and slower aging of the integrated circuits.

In an exemplary aspect, the power consumption of the at least one component of the mobile communication device may be reduced during the ensuing time frame if the prediction indicates that the base station is not going to address control information to the mobile communication device in the ensuing time frame.

In another exemplary aspect, the power consumption of the at least one component of the mobile communication device may be reduced during the ensuing time frame if the prediction indicates that the base station is going to address specific control information and/or specific content to the mobile communication device in the ensuing time frame.

Managing power consumption may include powering down an RF (radio frequency) receive channel or a modem of the mobile communication device.

In other words, the receive channel of the mobile communication device may be powered down (so as to save power in the mobile communication device) when the mobile communication device can predict, with a selectable minimum probability, that the base station is not going to address control information to the mobile communication device in the next time frame. An alternative or additional opportunity for powering down the receive channel of the mobile communication device may present itself when the mobile communication device can predict, with a selectable minimum probability, what control information and/or what content the base station is going to address to the mobile communication device in the next time frame. In either case, the mobile communication device may choose not to "listen" to the base station in the ensuing time frame and, thus, may reduce power consumption by switching off its receive channel for at least one time frame following n time frames on which the automatic prediction is based.

A mobile communication device seeking to predict the scheduling behavior of the base station may be considered to emulate the scheduling function of the base station. A base station may operate according to non-public (or confidential) rules established and owned by the manufacturer of the base station. Hence, from the perspective of the mobile communication device, the base station represents a black box. As the operating rules of the base station may be rather complex, its behavior may appear non-deterministic to other network participants such as the mobile communication device. However, despite said complexity, the base station actually operates in a deterministic manner by consistently applying and reproducing its rules even though a great proportion of those rules may not be transparent to the outside world. Due to the fundamentally deterministic nature of the base station operation, the inventors have established that the behavior of the base station, notably its scheduling function, may be predicted to a considerable extent by monitoring, analyzing and evaluating a number of periods of the base station operation. Observing and evaluating (off-line and/or on-line) a large number of base station operating periods increases the accuracy of the prediction. Existing machine learning concepts and algorithms may be used and optimized to evaluate past and/or current base station behavior with a view to predicting subsequent base station behavior.

The mobile communication device may not signal a prediction-based management action (e.g. a reduction of component power consumption) to the base station, i.e. the decision of the mobile communication device to power down its receive channel, for example, and not to listen to the base station for one or more time frames may be an autonomous decision by the mobile communication device, without any prior coordination or negotiation with the base station, as opposed to conventional RRC states of inactivity (such as DRX, cDRX, or Idle) which are approved by the base station. Hence, the prediction-based management of the mobile communication device may be put into practice without procedural delay (i.e. without interaction with the base station) and, thus, may exploit even short power saving opportunities (dynamic power management). Moreover, the benefits of prediction-based management do not depend on any amendment to network or telecommunication standards or protocols.

The prediction process may include determining a probability of the ensuing communication including control information addressed to the mobile communication device in the ensuing time frame, and comparing the probability with a threshold. The threshold may be selected by the mobile communication device so as to optimize stability and performance of the operation of the mobile communication device and/or base station while reducing the power consumption of the mobile communication device.

The prediction process may include using at least one machine learning algorithm configured to evaluate the n communications transmitted by the base station in the n respective time frames. The at least one machine learning algorithm may be selected from the group including Multilayer Perceptron (MLP), Elman Recurrent Neural Network (ELNN), and Support Vector Regression (SVR).

The prediction process may include selecting or configuring a machine learning algorithm based on at least one context parameter, e.g. network traffic, and/or on the power consumption of the algorithm. Thus, the mobile communication device may choose a prediction algorithm with a view to the complexity of a current network situation and the expected power consumption of the prediction process so as to balance the efficiency (accuracy and speed) of the prediction and the net power saving achievable by the prediction-based management of the mobile communication device. The mobile communication device may switch from one prediction algorithm to another prediction algorithm during operation of the mobile communication device in order to dynamically optimize the power management.

The prediction process may include extracting at least one network parameter accessible to the mobile communication device, and identifying (e.g. in addition or as an alternative) parameterizing at least one machine learning algorithm based on the at least one network parameter.

The prediction process may include using at least one machine learning algorithm emulating a scheduling function of the base station serving the mobile communication device in a cell of the communication network.

The prediction process may include predicting whether a plurality m of ensuing communications transmitted by the base station in m ensuing time frames will include control information addressed to the mobile communication device and, based on the prediction, the power consumption or other function of the at least one component of the mobile communication device may be managed during at least one of the ensuing time frames.

The prediction process may be suspended temporarily if the power consumption of the prediction process is expected to exceed a reduction of component power consumption achievable by the prediction-based management. Generally, the automatic prediction may be paused in complex network situations in which the prediction burden outweighs the benefits achievable by prediction-based management options of the mobile communication device.

A regular power supply or power state of the at least one component of the mobile communication device may be resumed at a minimum frequency overriding the prediction-based power management of the component. By way of example, resuming the power supply of the receive channel of the mobile communication device at least from time to time ensures that the mobile communication device is in line with the actual base-station behavior and inputs real base-station communications to the ongoing prediction process. A prediction by the mobile communication device may be based on a series of communications from the base station, and that series may include one or more communications predicted by the mobile communication device. However, the mobile communication device may base its predictions on a minimum number of actual base-station communications within a given time window.

Another aspect of the present disclosure relates to a mobile communication device for operation in a wireless communication network including at least one base station configured to transmit control information and content to the mobile communication device. The mobile communication device may be configured:
  to receive a number of communications transmitted by a base station in a number of time frames;
  to analyze whether the number of communications from the base station include control information addressed to the mobile communication device;
  to automatically predict whether a communication transmitted by the base station in a time frame includes control information addressed to the mobile communication device based on the analysis; and
  to manage an operation, e.g. the power consumption, of at least one component of the mobile communication device during the time frame based on the prediction.

Another aspect of the present disclosure relates to a method of communication between a mobile communication device and a base station in a wireless communication network, the method including:
  the base station transmits a plurality of communications in respective time frames, each communication including at least control information;
  the mobile communication device receives a number of communications transmitted by the base station in a number of time frames (the number of communications and the number of respective time frames may be greater than or equal to 1);
  the mobile communication device analyzes whether the number of communications from the base station include control information addressed to the mobile communication device;
  the mobile communication device automatically predicts whether a communication transmitted by the base station in a time frame includes control information addressed to the mobile communication device based on the analysis; and
  the mobile communication device manages the power consumption of at least one component of the mobile communication device during the ensuing time frame based on the prediction.

Another aspect of the present disclosure relates to an off-line method of training a machine learning prediction algorithm for use in a mobile communication device. The training method may include providing a plurality of archived communications (C1, C2, . . . ) that have been transmitted from a base station to a mobile communication device in a wireless communication network. A transmission pattern of the base station may be identified by correlating each archived communication (Cn+1) with a set of n preceding communications (C1, C2, . . . , Cn), n being an integer greater than or equal to 1. The algorithm may be configured so as to optimize (e.g. maximize) the probability of a prediction by the algorithm that a specific communication (Cn+1) will follow a set of n preceding communications (C1, C2, . . . , Cn).

Another aspect of the present disclosure relates to an on-line method of training a machine learning prediction algorithm used by a mobile communication device in a wireless communication network. The training method may include monitoring and storing a plurality of communications (C1, C2, . . . ) that are transmitted from a base station of the wireless communication network to the mobile communication device. A transmission pattern of the base station may be identified by correlating a stored communication (Cn+1) with a set of n preceding communications (C1, C2, . . . , Cn), n being an integer greater than or equal to 1. The algorithm may be configured so as to optimize (e.g. maximize) the probability of a prediction by the algorithm that a specific communication (Cn+1) will follow a set of n preceding communications (C1, C2, . . . , Cn).

The prediction process of the mobile communication device may use a prediction algorithm that was trained in an off-line method, and may additionally train the prediction algorithm on-line, preferably during real-time operation of the mobile communication device.

Advanced training methods may provide several configurations (or parametrizations) of one algorithm based on several parameters that reflect several network conditions accessible to the mobile communication device. During operation of the mobile communication device, the mobile communication device may extract a network condition and select a corresponding configuration of the prediction algorithm so as to enhance the accuracy and speed of the prediction by relying on a preset scenario, i.e. a proven parameter setting, which limits the search space of predictions.

In the following, various aspects of this disclosure will be illustrated:

Example 1 is a method of operating a mobile communication device in a wireless communication network including at least one base station configured to transmit control information and content to the mobile radio communication device. The method may include receiving a number of communications transmitted by a base station in a number of time frames, analyzing whether the number of communications from the base station include control information addressed to the mobile communication device, automatically predicting whether a communication transmitted by the base station after the transmission of the number of communication in a time frame includes the control information based on the analysis, and managing the power consumption of at least one component of the mobile radio communication device during the time frame if the time frame includes the control information.

In Example 2, the subject matter of Example 1 can optionally include that the method further includes reducing the power consumption of the at least one component of the mobile communication device during the time frame if no control information is addressed to the mobile communication device in the time frame.

In Example 3, the subject matter of any one of Examples 1 or 2 can optionally include that the method further includes reducing the power consumption of the at least one component of the mobile communication device during the time frame if the specific control information or specific content is addressed to the mobile communication device in the time frame.

In Example 4, the subject matter of any one of Examples 1 to 3 can optionally include that the managing power consumption includes powering down a radio frequency receive channel or a modem of the mobile communication device.

In Example 5, the subject matter of any one of Examples 1 to 4 can optionally include that no prediction-based reduction of power consumption is signaled by the mobile radio communication device to the base station.

In Example 6, the subject matter of any one of Examples 1 to 5 can optionally include that the method further includes determining a probability of the communication including control information addressed to the mobile communication device in the time frame, and comparing the probability to a threshold.

In Example 7, the subject matter of any one of Examples 1 to 6 can optionally include that the predicting step includes using at least one machine learning algorithm evaluating the number of communications transmitted by the base station in the number of time frames.

In Example 8, the subject matter of Example 7 can optionally include that the at least one machine learning algorithm is selected from the group consisting of: Multi-layer Perceptron, Elman Recurrent Neural Network, and Support Vector Regression.

In Example 9, the subject matter of any one of Examples 7 or 8 can optionally include that the method further includes selecting or configuring a machine learning algorithm based on at least one context parameter or on the power consumption of the algorithm.

In Example 10, the subject matter of any one of Examples 7 or 8 can optionally include that the method further includes selecting or configuring a machine learning algorithm based on network traffic.

In Example 11, the subject matter of any one of Examples 1 to 10 can optionally include that the method further includes extracting at least one network parameter accessible to the mobile communication device, and identifying at least one machine learning algorithm based on the at least one network parameter.

In Example 12, the subject matter of any one of Examples 1 to 11 can optionally include that the method further includes using at least one machine learning algorithm emulating a scheduling function of the base station serving the mobile communication device in a radio cell of the communication network.

In Example 13, the subject matter of any one of Examples 1 to 12 can optionally include that the method further includes further predicting whether a number of communications transmitted by the base station in a number of time frames includes control information addressed to the mobile radio communication device, and managing the power consumption of the at least one component of the mobile radio communication device based on the prediction during at least one of the time frames.

In Example 14, the subject matter of any one of Examples 1 to 13 can optionally include that the method further includes suspending the prediction if the power consumption of the prediction process is to exceed a reduction of component power consumption achievable by the prediction-based management.

In Example 15, the subject matter of any one of Examples 1 to 14 can optionally include that the method further includes resuming the power consumption of the at least one component of the mobile communication device at a minimum frequency overriding the prediction-based power management of the component.

In Example 16, the subject matter of any one of Examples 1 to 15 can optionally include that the number of communications transmitted by a base station and the number of respective time frames are greater than or equal to 1.

Example 17 is a mobile radio communication device for operation in a wireless communication network including at least one base station configured to transmit control information and content to the mobile radio communication device. The mobile radio communication device may be configured to receive a number of communications transmitted by a base station in a number of time frames, to analyze whether the number of communications from the base station include control information addressed to the mobile radio communication device, to automatically predict whether a communication transmitted by the base station after the transmission of the number of communication in a time frame includes the control information addressed to the mobile radio communication device based on the analysis, and to manage the power consumption of at least one component of the mobile radio communication device during the time frame if the time frame includes the control information.

In Example 18, the subject matter of Example 17 can optionally include that the mobile radio communication device is configured to reduce the power consumption of the at least one component during the time frame if no control information is addressed to the mobile radio communication device in the time frame.

In Example 19, the subject matter of any one of Examples 17 or 18 can optionally include that the mobile radio communication device is configured to reduce the power consumption of the at least one component of the mobile communication device during the time frame if specific control information or specific content is addressed to the mobile communication device in the time frame.

In Example 20, the subject matter of any one of Examples 17 to 19 can optionally include that the mobile radio communication device is configured to power down a radio frequency receive channel or a modem of the mobile communication device based on the prediction.

In Example 21, the subject matter of any one of Examples 17 to 20 can optionally include that the mobile radio communication device is configured not to signal a prediction-based reduction of power consumption to the base station.

In Example 22, the subject matter of any one of Examples 17 to 21 can optionally include that the mobile radio communication device is configured to determine a probability of the communication including control information addressed to the mobile communication device in the time frame, and to compare the probability to a threshold.

In Example 23, the subject matter of any one of Examples 17 to 22 can optionally include that the mobile radio communication device further includes at least one machine learning circuit configured to evaluate the number of communications transmitted by the base station in the number of time frames.

In Example 24, the subject matter of Example 23 can optionally include that the at least one machine learning module is configured to use an algorithm selected from the group consisting of: Multilayer Perceptron, Elman Recurrent Neural Network, and Support Vector Regression.

In Example 25, the subject matter of any one of Examples 23 or 24 can optionally include that the mobile radio communication device is configured to select or configure a machine learning module based on at least one context parameter or on the power consumption of the machine learning module.

In Example 26, the subject matter of any one of Examples 23 or 24 can optionally include that the mobile radio communication device is configured to select or configure a machine learning module based on network traffic.

In Example 27, the subject matter of any one of Examples 17 to 26 can optionally include that the mobile radio communication device is configured to extract at least one network parameter accessible to the mobile radio communication device and to identify at least one machine learning module based on the at least one network parameter.

In Example 28, the subject matter of any one of Examples 17 to 27 can optionally include that the mobile radio communication device further includes at least one machine learning circuit configured to emulate a scheduling function of the base station serving the mobile communication device in a radio cell of the communication network.

In Example 29, the subject matter of any one of Examples 17 to 28 can optionally include that the mobile radio communication device is configured to predict whether an additional number of communications transmitted by the base station in an additional number of time frames include control information addressed to the mobile radio communication device, and to manage the power consumption of the at least one component of the mobile radio communication device during at least one of the additional number of time frames based on the prediction.

In Example 30, the subject matter of any one of Examples 17 to 29 can optionally include that the mobile radio communication device is configured to suspend the prediction if the power consumption of a prediction circuit is to exceed the reduction of component power consumption achievable by the prediction-based management.

In Example 31, the subject matter of any one of Examples 17 to 30 can optionally include that the mobile radio communication device is configured to resume the power consumption of the at least one component at a minimum frequency overriding the prediction-based power management of the component.

In Example 32, the subject matter of any one of Examples 17 to 31 can optionally include that the number of communications transmitted by a base station and the number of respective time frames are greater than or equal to 1.

Example 33 is a method of communication between a mobile radio communication device and a base station in a wireless communication network. The method may include: the base station transmitting a plurality of communications in a plurality of time frames, each communication including at least control information, the mobile radio communication device receiving a number of communications transmitted by the base station in a number of time frames, the mobile communication device analyzing whether the number of communications from the base station include control information addressed to the mobile communication device, the mobile radio communication device automatically predicting whether a communication transmitted by the base station in a time frame includes control information addressed to the mobile radio communication device based on the analysis, and the mobile radio communication device managing an operation of at least one component of the mobile radio communication device during the time frame based on the prediction.

In Example 34, the subject matter of Example 33 can optionally include that the method further includes: the mobile radio communication device reducing the power consumption of the at least one component of the mobile radio communication device during the time frame if no control information is addressed to the mobile communication device in the time frame.

In Example 34, the subject matter of any one of Examples 33 or 34 can optionally include that the method further includes: the mobile radio communication device reducing the power consumption of the at least one component of the mobile radio communication device during the time frame if specific control information or specific content is addressed to the mobile radio communication device in the time frame.

In Example 36, the subject matter of any one of Examples 33 to 35 can optionally include that the method further includes: the mobile radio communication device powering down a radio frequency receive channel or a modem of the mobile radio communication device.

In Example 37, the subject matter of any one of Examples 33 to 36 can optionally include that no prediction-based reduction of power consumption is signaled by the mobile radio communication device to the base station.

Example 38 is a method of training a machine learning algorithm for use in a mobile radio communication device according to any one of Examples 17 to 32. The method may include providing a plurality of archived communications that have been transmitted from a base station to a mobile radio communication device in a wireless communication network, identifying a transmission pattern of the base station by correlating each archived communication with a set of a number of preceding communications, and configuring the machine learning algorithm so as to optimize the probability of a prediction by the machine learning algorithm that a specific communication will follow a set of a number of preceding communications.

Example 39 is a method of training a machine learning algorithm used by a mobile radio communication device in a wireless communication network. The method may include: storing a plurality of communications that are transmitted from a base station of the wireless communication network to the mobile radio communication device, identifying a transmission pattern of the base station by correlating a stored communication with a set of a number of preceding communications, and configuring the machine learning algorithm so as to optimize the probability of a prediction by the machine learning algorithm that a specific communication will follow a set of a number of preceding communications.

In Example 40, the subject matter of Example 39 can optionally include that several configurations of the machine learning algorithm are provided based on several parameters that reflect several network conditions accessible to the mobile radio communication device.

Example 41 is a method of operating a mobile radio communication device in a wireless communication network including at least one base station configured to transmit control information and content to the mobile radio communication device. The method may include: receiving a number of communications transmitted by a base station in a number of time frames, analyzing whether the number of communications from the base station include control information addressed to the mobile radio communication device, automatically predicting whether a communication transmitted by the base station in a time frame includes control information addressed to the mobile radio communication device based on the analysis, and managing an operation of at least one component of the mobile radio communication device during the time frame based on the prediction.

In Example 42, the subject matter of Example 41 can optionally include that managing the operation of the at least one component during the time frame comprises reducing the power consumption of the at least one component during the time frame.

In Example 43, the subject matter of any one of Examples 41 or 42 can optionally include that managing the operation of the at least one component during the time frame comprises dedicating a resource of the mobile radio communication device to a task of the mobile communication device for at least two successive time frames.

In Example 44, the subject matter of any one of Examples 41 to 43 can optionally include that no prediction-based management of the at least one component is signaled by the mobile communication device to the base station.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of operating a mobile communication device in a wireless communication network comprising at least one base station configured to transmit control information and content to the mobile radio communication device, the method comprising:
   receiving a number of communications from a base station in a number of time frames;
   analyzing whether the number of communications from the base station include control information addressed to the mobile communication device;
   for a communication to be received from the base station in a time frame after the number of time frames, automatically predicting whether said communication includes the control information based on the analysis; and
   managing the power consumption of at least one component of the mobile radio communication device during the time frame when the time frame is predicted to include the control information.

2. The method of claim 1, further comprising:
   reducing the power consumption of the at least one component of the mobile communication device during the time frame when the time frame is predicted to include no control information addressed to the mobile communication device.

3. The method of claim 1, further comprising:
   reducing the power consumption of the at least one component of the mobile communication device during the time frame when the specific control information or specific content is addressed to the mobile communication device in the time frame.

4. The method of claim 1, wherein said managing power consumption comprises powering down a radio frequency receive channel or a modem of the mobile communication device.

5. The method of claim 1, further comprising:
   determining a probability of the communication including control information addressed to the mobile communication device in the time frame, and comparing the probability to a threshold.

6. The method of claim 1, wherein said automatically predicting comprises using at least one machine learning algorithm to evaluate the number of communications transmitted by the base station in the number of time frames.

7. The method of claim 1, further comprising:
extracting at least one network parameter accessible to the mobile communication device, and
identifying at least one machine learning algorithm based on the at least one network parameter.

8. The method of claim 1, further comprising:
using at least one machine learning algorithm to emulate a scheduling function of the base station that serves the mobile communication device in a radio cell of the communication network.

9. The method of claim 1, further comprising:
resuming the power consumption of the at least one component of the mobile communication device at a minimum frequency overriding the prediction-based power management of the component.

10. The method of claim 1, further comprising:
suspending the prediction when the power consumption of the prediction process is to exceed a reduction of component power consumption achievable by the prediction-based management.

11. The method of claim 1, wherein the number of communications transmitted by the base station and the number of respective time frames are greater than or equal to 1.

12. A mobile radio communication device for operation in a wireless communication network comprising at least one base station configured to transmit control information and content to the mobile radio communication device, the mobile radio communication device being configured to:
receive a number of communications from a base station in a number of time frames;
analyze whether the number of communications from the base station include control information addressed to the mobile radio communication device;
for a communication to be received from the base station in a time frame after the number of time frames, automatically predict whether said communication includes the control information addressed to the mobile radio communication device based on the analysis; and
manage the power consumption of at least one component of the mobile radio communication device during the time frame when the time frame is predicted to include the control information.

13. The mobile radio communication device of claim 12, configured to reduce the power consumption of the at least one component of the mobile communication device during the time frame when specific control information or specific content is addressed to the mobile communication device in the time frame.

14. The mobile radio communication device of claim 12, configured to power down a radio frequency receive channel or a modem of the mobile communication device based on the prediction.

15. The mobile radio communication device of claim 12, further comprising:
at least one machine learning circuit configured to evaluate the number of communications transmitted by the base station in the number of time frames.

16. The mobile radio communication device of claim 12, further comprising:
at least one machine learning circuit configured to emulate a scheduling function of the base station serving the mobile communication device in a radio cell of the communication network.

17. The mobile radio communication device of claim 12, further configured to:
predict whether an additional number of communications transmitted by the base station in an additional number of time frames include control information addressed to the mobile radio communication device; and
manage the power consumption of the at least one component of the mobile radio communication device during at least one of the additional number of time frames based on the prediction.

18. The mobile radio communication device of claim 12, configured to suspend the prediction when the power consumption of a prediction circuit is to exceed the reduction of component power consumption achievable by the prediction-based management.

19. The mobile radio communication device of claim 12, further configured to resume the power consumption of the at least one component at a minimum frequency, overriding the prediction-based power management of the component.

20. The mobile radio communication device of claim 12, configured to reduce the power consumption of the at least one component during the time frame when the time frame is predicted to include no control information addressed to the mobile communication device.

21. The mobile communication device of claim 12, configured to determine a probability of the communication including control information addressed to the mobile communication device in the time frame, and to compare the probability to a threshold.

22. The mobile radio communication device of claim 12, configured to extract at least one network parameter accessible to the mobile radio communication device, and to identify at least one machine learning module based on the at least one network parameter.

23. A non-transitory memory medium for operating a mobile communication device, wherein the non-transitory memory medium stores program instructions, wherein the program instructions, when executed by a processor, cause the mobile communication device to perform:
receiving a number of communications from a base station in a number of time frames;
analyzing whether the number of communications from the base station include control information addressed to the mobile communication device;
for a communication to be received from the base station in a time frame after the number of time frames, automatically predicting whether said communication includes the control information based on the analysis; and
managing the power consumption of at least one component of the mobile radio communication device during the time frame when the time frame is predicted to include the control information.

24. The non-transitory memory medium of claim 23, wherein the program instructions, when executed by the processor, further cause the mobile communication device to perform:
reducing the power consumption of the at least one component of the mobile communication device during the time frame when the time frame is predicted to not include the control information addressed to the mobile communication device.

25. The non-transitory memory medium of claim 23, wherein said managing power consumption comprises powering down a radio frequency receive channel or a modem of the mobile communication device.

* * * * *